(12) United States Patent
Prud'Homme Lacroix et al.

(10) Patent No.: US 10,822,111 B2
(45) Date of Patent: Nov. 3, 2020

(54) SYSTEM FOR PROTECTING AN AIRCRAFT AGAINST HARD LANDINGS

(71) Applicant: AIRBUS HELICOPTERS, Marignane (FR)

(72) Inventors: Pierre Prud'Homme Lacroix, Vitrolles (FR); Remy-Elian Arnaud, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 327 days.

(21) Appl. No.: 15/878,441

(22) Filed: Jan. 24, 2018

(65) Prior Publication Data
US 2018/0208325 A1 Jul. 26, 2018

(30) Foreign Application Priority Data

Jan. 26, 2017 (FR) ..................... 17 00071

(51) Int. Cl.
| | |
|---|---|
| *B64D 45/00* | (2006.01) |
| *B64C 1/00* | (2006.01) |
| *F16F 7/12* | (2006.01) |
| *B64C 1/06* | (2006.01) |
| *F16F 7/08* | (2006.01) |

(52) U.S. Cl.
CPC ............ *B64D 45/00* (2013.01); *B64C 1/0009* (2013.01); *B64C 1/062* (2013.01); *F16F 7/08* (2013.01); *F16F 7/12* (2013.01)

(58) Field of Classification Search
CPC ......... B64C 1/062; B64C 25/32; B64C 25/64; B64F 1/007; F16F 7/12
See application file for complete search history.

(56) References Cited

U.S. PATENT DOCUMENTS

| | | |
|---|---|---|
| 3,682,463 A | 8/1972 | Radimirsch et al. |
| 3,847,426 A | 11/1974 | McGettigan |
| | (Continued) | |

FOREIGN PATENT DOCUMENTS

| | | |
|---|---|---|
| DE | 19860249 C1 | 7/2000 |
| DE | 102009020896 A1 | 11/2010 |
| | (Continued) | |

OTHER PUBLICATIONS

French Search Report for French Application No. FR 1700071, Completed by the French Patent Office, dated Oct. 17, 2017, 7 pages.

*Primary Examiner* — Christopher D Hutchens
(74) *Attorney, Agent, or Firm* — Brooks Kushman P.C.

(57) ABSTRACT

A system for providing an aircraft with protection against hard landings, the system comprising friction energy absorber systems arranged at the points the aircraft will impact against the ground in the event of a crash. The friction energy absorber system has two energy absorber devices arranged between a base and a cover along two non-parallel deformation axes, a support secured to the base and suitable for moving in translation relative to the cover, and a friction device. The friction device is arranged between the cover and the support and it generates a friction force along a translation axis parallel to a deformation axis such that the energy absorber device, after being plastically deformed during a crash, remains in contact with the support and the cover.

20 Claims, 1 Drawing Sheet

(56) References Cited

U.S. PATENT DOCUMENTS

| | | | |
|---|---|---|---|
| 3,851,911 A | | 12/1974 | Brooks |
| 4,227,593 A | | 10/1980 | Bricmont et al. |
| 5,542,626 A | * | 8/1996 | Beuck ..................... B64C 1/062 |
| | | | 244/105 |
| 8,656,823 B2 | * | 2/2014 | Kaswen ..................... F16F 9/06 |
| | | | 280/784 |
| 2005/0046098 A1 | * | 3/2005 | Jen ........................... E04H 9/02 |
| | | | 267/153 |
| 2007/0063100 A1 | * | 3/2007 | Bailey ..................... B64C 1/062 |
| | | | 244/118.1 |
| 2010/0155537 A1 | | 6/2010 | Barland et al. |
| 2012/0187717 A1 | * | 7/2012 | Tanaka ..................... B64C 27/04 |
| | | | 296/187.03 |
| 2014/0001312 A1 | * | 1/2014 | Milliere ................. B64C 1/062 |
| | | | 244/121 |
| 2015/0151829 A1 | * | 6/2015 | Hachenberg ............ B64C 1/062 |
| | | | 244/131 |
| 2015/0336654 A1 | | 11/2015 | Cottet et al. |
| 2018/0072437 A1 | * | 3/2018 | Sakamoto ............... F16F 7/121 |

FOREIGN PATENT DOCUMENTS

| | | |
|---|---|---|
| FR | 2058954 A5 | 5/1971 |
| WO | 9710145 | 3/1997 |

* cited by examiner

SYSTEM FOR PROTECTING AN AIRCRAFT AGAINST HARD LANDINGS

CROSS-REFERENCE TO RELATED APPLICATIONS

This application claims priority to French patent application No. FR 17 00071 filed on Jan. 26, 2017, the disclosure of which is incorporated in its entirety by reference herein.

BACKGROUND OF THE INVENTION

(1) Field of the Invention

The present invention relates to the field of protection and energy absorber devices. It relates in particular to protection devices for aircraft in the event of a hard landing or a crash.

The present invention relates to a friction energy absorber system and to a system for protecting an aircraft against hard landings. The present invention also relates to an aircraft having one or more protection systems against hard landings.

2) Description of Related Art

An aircraft generally has landing gear made up of a plurality of independent "undercarriages" respectively provided with one or more wheels. Such an undercarriage is also generally provided with at least one shock absorber device. For example, both a rocker-arm undercarriage and a straight undercarriage are known for use in particular on rotary wing aircraft.

Such an undercarriage may also be retractable in full or in part into the fuselage of the aircraft and for this purpose it may include a retraction and extension device. As a result, its contribution to the aerodynamic drag of the aircraft is limited or zero while the aircraft is in flight.

It should be observed that in the particular situation of a rotary wing aircraft, the landing gear may also be formed by a single set of skids, referred to as "skid landing gear". As a general rule, skid landing gear comprises two skids and two cross-members connecting the skids together.

The particular functions of landing gear are to hold the aircraft while it is on the ground and also to absorb the shock of the aircraft impacting against the ground during a landing.

Furthermore, in the event of hard landings and/or a crash, one or more undercarriages may be destroyed. The structure of the aircraft then comes directly into contact with the ground during such a hard landing or crash. The structure of the aircraft constitutes a strong point that will transmit large load factors to the structure of the aircraft and to its occupants.

An analogous situation can occur in the event of a failure of the device for retracting and extending an undercarriage in an aircraft that has retractable landing gear.

The structure of an aircraft is generally designed on the basis of static strength and also of fatigue strength under conditions of flight for the aircraft. This results in the structure having a degree of stiffness, in particular in the frames and stringers that make it up. Depending on the way it is fabricated, e.g. whether it is made of metal or out of composite materials, the structure generally possesses small or even very small ranges of elastic and plastic deformation that can be used for absorbing energy during a hard landing or a crash. Consequently, large decelerations are generated during such a hard landing or crash. These decelerations may for example be of the order of 25 to 30 times the acceleration of the Earth's gravity for a metal structure and of the order of 50 to 60 times the acceleration of the Earth's gravity for a structure made of composite materials.

Such conditions require suitable dimensioning in particular for the fastening techniques used with the structure of the aircraft. Consequently, the strength range of the structure is limited in terms of speed of impact, which has a direct effect on the deceleration to which the occupants of the aircraft are subjected during a hard landing or indeed a crash.

There exist certain improvement solutions that enable the structure of the aircraft to withstand a hard landing or a crash better, and these solutions may possibly be combined.

For example, it is possible to reinforce the fastening techniques used with the structure in order to avoid premature collapse of the structure during a hard landing or indeed a crash. Nevertheless, such reinforcement leads to an increase in the weight of the support and also in its stiffness. Furthermore, such an increase in the stiffness of the structure also contributes to increasing the decelerations that are generated during a hard landing or indeed a crash, and consequently to an increase in the stresses to which the occupants of the aircraft are subjected.

Another improvement solution is to use one or more load limiter devices or energy absorber devices incorporated in the structure of the aircraft.

By way of example, a load limiter device comprises one or more fusible elements and seeks to create a stroke starting from a predetermined force threshold in order to limit the accelerations to which the structure of the aircraft is subjected and thereby limit the stresses to which the occupants of the aircraft are subjected. By way of example, a fusible element may be a deformable and crushable zone incorporated in the structure or arranged at points that impact against the ground in the event of a hard landing or a crash. Nevertheless, such fusible elements are difficult to dimension appropriately, in particular in terms of fatigue, since they might be subjected to forces and stresses during flight. Furthermore, using them involves increasing the weight of the structure, which can contribute to limiting their net positive contribution.

An energy absorber device has elements that are plastically deformable as from a predetermined force threshold, e.g. corrugated metal sheets or a structure with cells such as honeycomb shapes. Such plastic deformation serves to absorb a portion of the energy that is transmitted during a hard landing or indeed a crash. However, as with a fusible element, such an energy absorber device is generally not usable after first plastic deformation. Furthermore, the first plastic deformation of such an energy absorber device is accompanied by a force peak that corresponds to a threshold for triggering the energy absorber device and that is of a value that can vary depending on the dynamics of the stress prior to beginning to deform plastically as from a predetermined force threshold that is less than the force peak.

By way of example, such an energy absorber device that is used with landing gear is described in Document WO 97/10145. The energy absorber device reacts to forces transmitted by a telescopic pivot. A force below a predetermined threshold has no effect on the energy absorber device, whereas a force that is greater than or equal to the threshold leads to plastic deformation of the energy absorber device and consequently to absorption of a portion of the energy that is transmitted during a landing. Deformation of the energy absorber device is accompanied by a utilization indicator that indicates the plastic deformation to which the energy absorber device has been subjected and its remaining capacity for absorbing energy.

Likewise, Document FR 2 058 954 describes an impact absorber element that acts progressively for aircraft landing gear. The absorber element comprises a structure with cells that are to deform plastically in order to absorb energy. By way of example, the cells are constituted by honeycomb shapes, by tubes, or indeed by microbeads. The load to which the landing gear is subjected is transmitted progressively to the absorber by using a plane face of the absorber in contact with a curved or pyramid-shaped surface of a member of the landing gear.

Also known is Document US 2015/336654, which describes a system for protecting an aircraft against hard landings. That protection system comprises a cover and a core made of a material that is plastically deformable and enables energy to be absorbed. That protection system is fastened under the fuselage of the aircraft.

Finally, Documents DE 198 60 249 and U.S. Pat. No. 3,851,911 are known, which describe motor vehicle bumpers, each including an energy absorber device.

According to Document DE 198 60 249, the energy absorber device is formed by a deformation tube connected to the bumper and to the structure of the motor vehicle, and by a bushing secured to the structure and serving to guide the deformation tube. The deformation tube can slide in the bushing while generating a friction force. The bumper may have two energy absorber devices with the deformation and movement axes of those two energy absorber devices being mutually parallel.

According to Document U.S. Pat. No. 3,851,911, the energy absorber device is provided with two torsion bars and two rolls of corrugated sheet arranged in respective cylinders. In the event of an impact, the torsion bars serve to provide first energy absorption by elastic deformation. Where necessary, the corrugated sheet rolls then deform plastically so as to absorb at least a portion of the remaining energy of the impact. The rolls are compressed by a piston moving with little friction in the cylinder.

Furthermore, Documents U.S. Pat. No. 4,227,593, US 2010/155537, DE 10 2009 020 896, and U.S. Pat. No. 3,847,426 form part of the technological background of the invention.

Consequently, for the structure of an aircraft, the ranges of protection that are obtained are limited to hard landings and to crashes that occur at a speed in the range 6 meters per second (m/s) to 8 m/s for a structure having no improvement solution, and may cover hard landings and crashes taking place at speeds of the order of 10 m/s to 12 m/s for a structure having at least one such improvement solution.

BRIEF SUMMARY OF THE INVENTION

An object of the present invention is to avoid the above-mentioned limitations and to propose an energy absorber system for aircraft that enables aircraft to withstand the conditions of a hard landing or indeed a crash better and also to limit the energy and the forces that are transmitted to the structure of the aircraft. The present invention thus makes it possible to limit the decelerations and the load factors generated on the structure during a hard landing or indeed a crash, and consequently to limit the stresses to which the occupants of the aircraft are subjected. The present invention also makes it possible to avoid using modules for reinforcing the structure of the aircraft and/or fusible elements within that structure that would lead to an increase in the weight of the aircraft.

In this context, the present invention proposes a friction energy absorber system intended in particular for aircraft.

The invention also provides a system for protection on aircraft against hard landings and comprising one or more friction energy absorber systems, and the invention also provides an aircraft provided with one or more systems for protection against hard landings.

According to the invention, a friction energy absorber system comprises:
a base;
a cover;
at least one support secured to the base and configured to be connected to the cover so as to allow movement between the support and the cover at least in translation along a translation axis At, At'; and
at least one energy absorber device arranged between the base and the cover so as to be in contact with the base and the cover.

Independently of where it is installed in the friction energy absorber system of the invention, each energy absorber device enables energy to be absorbed by deforming plastically in compression as soon as a force is applied thereto that is greater than a deformation threshold along a deformation axis Ad, Ad'. By way of example, the energy absorber device comprises a cellular structure, making it possible to increase its strength while limiting its weight. A cellular structure, for which a widespread embodiment is in the form of a honeycomb, may typically be made out of metal, such as aluminum, or out of card, or indeed out of plastics material.

The friction energy absorber system is remarkable in that it includes at least one friction device arranged between the cover and each support, each friction device generating a friction force during a movement in translation between said support and the cover along the translation axis At, At' of the support such that the energy absorber device, after becoming deformed plastically, remains in contact with and bearing against the base and the cover along the translation axis At, At'.

The friction energy absorber system of the invention is intended most particularly for fitting to an aircraft in order to form in particular a system for providing the aircraft with protection against hard landings or even against a crash.

The base of the friction energy absorber system is then fastened to the structure of the aircraft by fastener means that are preferably releasable so as to enable the friction energy absorber system to be replaced, should that be necessary. By way of example, releasable fastener means may be formed by rivets or indeed by bolts. The base may also be fastened to the structure by using adhesive as the releasable fastener means. The base of the friction energy absorber system may also be formed directly by the structure of the aircraft, with each support then being secured directly to the structure of the aircraft.

The cover is held to the base via each friction device arranged between the cover and each support. Nevertheless, the friction energy absorber system of the invention may include securing means between the cover and the base, preferably arranged at the periphery of the cover in order to fasten the cover to the base. By way of example, such securing means may be formed by one or more bolts, one or more rivets, adhesive, welding, or any other fastener device. Nevertheless, when the base is formed directly by the structure of the aircraft, the cover may be fastened to the structure by fastener means that are preferably releasable. The cover is then secured to the base by the securing means or else by the fastener means.

Furthermore, the cover is deformable under a deformation force. For this purpose, the cover may include deformable zones adapted to deform plastically under the deformation force. Under such circumstances, the cover may be made of metal or of composite materials. The cover may also be suitable for deforming plastically as a whole under the deformation force, with the cover being made out of a ductile material for example, such as a ductile metal.

The support is secured to the base. The support may be fastened to the base via securing means as described above. The support may also be incorporated in the base. Nevertheless, when the base is formed directly by the structure of the aircraft, the support is fastened to that structure by fastener means that are preferably releasable. Unlike the cover, the base and the support are not intended to be deformable and may be made out of composite materials or out of metal, for example.

Each support is also connected to the cover via a connection allowing movement in translation along the translation axis At, At', e.g. a pivot type connection that is slidable or indeed a slideway connection along the translation axis At, At'.

Preferably, each support and each friction device are arranged in such a manner that a translation axis At, At' for movement between a support and the cover associated with a friction device extends parallel to a deformation axis Ad, Ad' of an energy absorber device.

In addition, the energy absorber device is preferably precompacted prior to being arranged in the friction energy absorber system of the invention. This eliminates the force peak associated with first plastic deformation of the energy absorber device and corresponding to a trigger threshold of the energy absorber device that is greater than the deformation threshold.

Such precompacting may be obtained by exerting compression on the energy absorber device over a short stroke serving to exceed the force peak. This compression short stroke depends on the characteristics of the energy absorber device, and in particular on the material and the shapes used. Thereafter, the friction energy absorber system may deform as soon as a force is applied that is greater than the deformation threshold without needing beforehand to go through the force peak, which is of a value that is not accurately known. The deformation threshold may be determined accurately by taking account of the precompacting and the elimination of this peak.

Inside the friction energy absorber system of the invention, each energy absorber device is arranged between the base and the cover in such a manner as to be in contact with the base and the cover, in particular along the translation axis At, At' of each support in the zone of that support. The energy absorber device is thus arranged in the friction energy absorber system of the invention with axial abutments along each translation axis At, At' relative to the base and the cover. Under such circumstances, relative movement along a translation axis At, At' between the base and the cover is possible following compression deformation of the energy absorber device and deformation of the cover.

This deformation of the energy absorber device and of the cover is possible on applying a force to the friction energy absorber system. By way of example, the force may be generated by a hard landing or indeed a crash when the friction energy absorber system of the invention is fitted to an aircraft.

The use of the friction device serves advantageously to guarantee that the cover is held in position relative to each support, and consequently relative to the base and each energy absorber device, thereby reducing or indeed eliminating the force. Specifically, the friction force opposes in particular the force of the Earth's gravity and avoids the cover moving relative to the support under the action of the Earth's gravity.

Each friction device thus avoids the cover separating from the friction energy absorber system. Furthermore, each friction device advantageously avoids clearance appearing between the cover and the energy absorber device, in particular along each translation axis At, At', and consequently avoids the appearance of potential noise and/or vibration.

By way of example, the friction device is a gasket arranged between a support and the cover, or indeed any other element suitable for generating a friction force or indeed axial friction, i.e. friction parallel to the translation axis At, At' between a support and the cover.

The friction force is thus at least greater than the weight of the cover. This weight is characterized by the product of the mass of the cover multiplied by the acceleration of the Earth's gravity. Preferably, a safety margin is added to this weight in order to determine the friction force so as to accommodate possible vertical acceleration of the aircraft to which the friction energy absorber system might be subjected in flight and during landings and takeoffs of the aircraft.

Energy is absorbed by the energy absorber device as a result of plastic deformation of the energy absorber device and of the cover as soon as a compression force is applied to the friction energy absorber system of the invention that exceeds a sliding threshold, itself greater than the deformation threshold of the energy absorber device. Specifically, the sliding threshold is equal to the deformation threshold plus a component of the friction force of each friction device parallel to the direction in which the force is applied, plus the deformation force of the cover.

In particular, an energy absorber device having its deformation threshold defined along a deformation axis Ad parallel to a translation axis At between a support and the cover and associated with a friction device generating a friction force, deforms plastically as soon as a compression force greater than a sliding threshold equal to the sum of the deformation threshold plus the friction force plus the deformation force of the cover is applied along the translation axis At to the friction energy absorber system. This plastic deformation of the energy absorber device is accompanied by plastic deformation of the cover and by relative movement between the support and the cover along the translation axis At. The energy absorber device deforms plastically and absorbs energy so long as the force remains greater than the sliding threshold.

Furthermore, relative movement in translation along the translation axis At between the support and the cover is also possible as soon as a force along the translation axis At greater than the sum of friction threshold plus the deformation force is applied in compression between the base and the cover. Nevertheless, this movement takes place over a stroke that is very small, limited, and accompanied by elastic deformation of the energy absorber device and of the cover.

Consequently, the use of the friction device serves advantageously to increase the force from which the energy absorber device deforms plastically and serves to absorb energy. This energy is dissipated for the most part in the plastic deformation of the energy absorber device, and to a lesser extent, in the plastic deformation of the cover and in the friction generated in the friction device accompanying the movement in translation between the support and the cover.

As a result, the energy absorber device conserves its capacity to absorb energy for the most demanding of circumstances. It may be observed that a small amount of energy dissipation also takes place during elastic deformation of the energy absorber device and during elastic deformation of the cover.

Furthermore, the friction force and the deformation force are preferably much smaller than the smallest deformation threshold. The friction force and the deformation force, may for example have a value lying in the range 5% to 10% of the smallest deformation threshold.

Finally, when the friction energy absorber system has at least two energy absorber devices, the energy absorber devices may have deformation axes Ad, Ad' that are not parallel. As a result, the friction energy absorber system of the invention can deform in compression along these respective non-parallel deformation axes Ad, Ad', thereby absorbing energy in along different directions.

The present invention also provides a protection system for protecting an aircraft against hard landings, the system including at least one friction energy absorber system as described above. Preferably, the system for protection against hard landings has a plurality of friction energy absorber systems.

Each friction energy absorber system is arranged at an impact point where the aircraft will impact against the ground, following destruction of its landing gear in the event of hard landings or a crash. Such impact points of the aircraft with the ground may be referred to as "strong points" of the structure of the aircraft.

The base of each friction energy absorber system is then fastened to the structure of the aircraft or else it is formed directly by the structure of the aircraft.

Following destruction of the landing gear of the aircraft during a hard landing or a crash, a large force is transmitted directly to the structure of the aircraft parallel to the direction of its impact against the ground. The system for protection against hard landings serves advantageously to absorb a portion of the energy absorbed by the impact of the aircraft against the ground and to limit the transfer of this energy to the structure of the aircraft. Consequently, the system for protection against hard landings serves firstly to preserve the mechanical integrity of the structure of the aircraft and secondly the physical integrity of the occupants of the aircraft.

Furthermore, the use of at least one energy absorber device and of at least one friction device between the cover and the support serves to avoid any elastic return after a first impact of the aircraft against the ground leading to partial total compression of each energy absorber device, and consequently serves to limit the rebound effect of the aircraft after the first impact. In addition, the use of friction energy absorber systems can enable potential for absorbing energy to be conserved so as to remain functional for absorbing the energy of a possible second impact against the ground following a rebound.

It is this second impact that can be found to be destructive for the structure of the aircraft, since the structure is then no longer capable of absorbing energy. Specifically, and by way of example, the fusible elements it includes may have been triggered during the first impact so that the structure is subjected in full and directly to the energy of the second impact. The same applies during impacts for which the aircraft has a large horizontal speed component, with residual energy absorption in the horizontal direction being made more difficult as a result of the consequences of the first impact.

The use of at least one friction device in each friction energy absorber system serves advantageously to avoid the cover separating from a friction energy absorber system during the first impact with the ground and to limit the rebound effect of the aircraft, while keeping the friction energy absorber system functional in order to absorb energy during a potential second impact against the ground.

The system of the invention for protection against hard landings serves advantageously to replace the solutions conventionally used for improving the strength of the structure of an aircraft, such as reinforcing the structure of the aircraft and/or installing fusible elements, while minimizing any increase in the weight of the aircraft.

Furthermore, each friction energy absorber system may be installed outside the structure of the aircraft. As a result, each friction energy absorber system may be installed on an aircraft even through such installation was not initially intended, thus giving the aircraft better ability to withstanding a hard landing or a crash at the price of a small increase in weight.

Advantageously, each friction energy absorber system has little or no sensitivity to the mechanical stresses, in particular fatigue stresses, that are generated during flights of the aircraft. Likewise, the behavior of each friction energy absorber system is not altered by thermal stresses or temperature variations, even when large. Specifically, each friction energy absorber system does not suffer aging and is not subjected to a limit lifetime. As a result, each friction energy absorber system does not require maintenance or replacement until it is used during a hard landing or a crash, for example.

In addition, following a moderate impact against the ground, the structure of the aircraft is generally preserved and the aircraft can be made operational once more after replacing the friction energy absorber systems of the system for protection against hard landings, and possibly also after inspecting the integrity of the structure, should that be necessary. Such replacement is made that much easier by using releasable fastener means.

Finally, the system for protection against hard landings by absorbing a portion of the energy of the impact of the aircraft against the ground makes it possible to preserve the physical integrity of the occupants of the aircraft and to limit any risk of injury.

In order to take account of various potential directions of impact, the system for protection against hard landings may include a plurality of friction energy absorber systems pointing in different directions.

Likewise, each friction energy absorber system may have at least two energy absorber devices with deformation axes Ad, Ad' that are not parallel so as to be capable of absorbing energy during a hard landing or a crash of the aircraft in different directions.

The directions of aircraft impacts against the ground that should be given precedence include in particular the vertical direction, i.e. the direction of the Earth's gravity, and the longitudinal direction of the aircraft, which generally corresponds to its direction of advance. Precedence may also be given to the lateral direction of the aircraft.

The present invention also provides an aircraft. The aircraft includes a structure and at least one friction energy absorber system as described above, each friction energy absorber system being designed to be arranged on the structure of the aircraft at potential points of impact of the aircraft against the ground in the event of a hard landing or a crash of the aircraft.

Preferably, the aircraft has a plurality of friction energy absorber systems. The friction energy absorber systems then form a system for protecting against hard landings.

The base of each friction energy absorber system is then fastened to the structure of the aircraft or else it is formed directly on the structure of the aircraft.

Depending on its position on the structure of the aircraft, the cover of each friction energy absorber system may be of a shape that is appropriate for limiting the aerodynamic drag is generates while the aircraft is in flight.

BRIEF DESCRIPTION OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
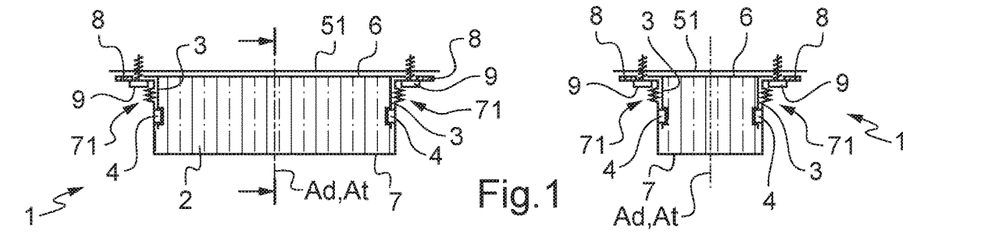
FIGS. 1 to 3 show three embodiments of a friction energy absorber system.
Figure 2:
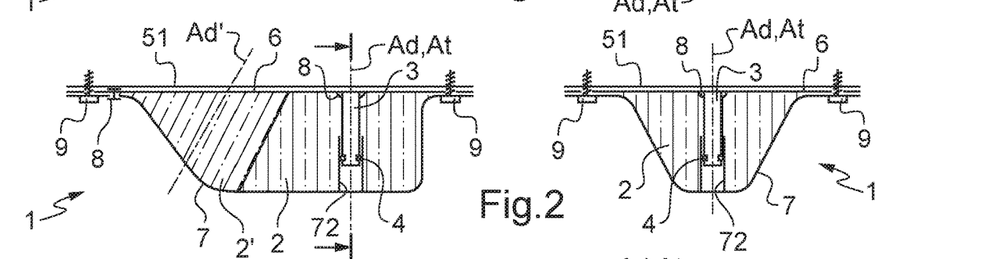
Figure 3:
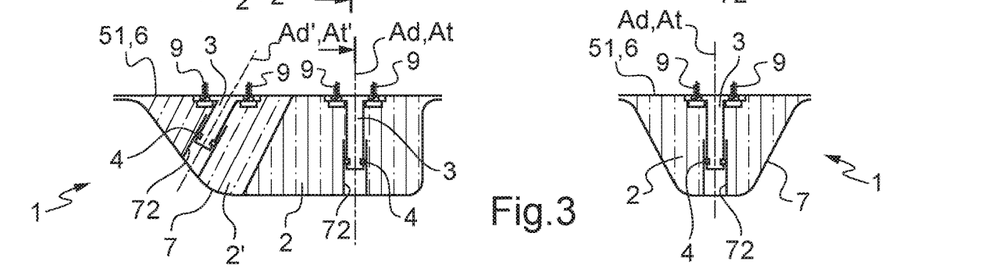

The three embodiments of a friction energy absorber system 1 shown in FIGS. 1 to 3 are fastened to the structure 51 of an aircraft 5. Each figure comprises, in section, both a side view and a front view of a friction energy absorber system 1.

In common to these three embodiments, a friction energy absorber system 1 comprises a base 6, a cover 7, at least one support 3, at least one energy absorber device 2, and a friction device 4.

Each energy absorber device 2 is arranged inside the friction energy absorber system 1 between the base 6 and the cover 7 so as to be in contact with and bearing against the base 6 and the cover 7. Apart from its installation in the friction energy absorber system 1, each energy absorber device 2 serves to absorb energy by deforming plastically in compression as soon as a force is applied that is greater than a deformation threshold along a deformation axis Ad, Ad'. Each energy absorber device 2 is preferably precompacted prior to being positioned inside the friction energy absorber system 1 in order to eliminate a force peak associated with the first plastic deformation of the energy absorber device 2.

Each support 3 is secured to the base 6 and is connected to the cover 7 via a connection that allows for movement between the support 3 and the cover 7 at least in translation along a translation axis At, At'. A friction device 4 is arranged between the cover and each support 3. Each friction device 4 generates a friction force during movement between a support 3 and the cover 7 along the translation axis At, At' of the support 3. The friction forces are preferably less than the deformation thresholds.

The friction energy absorber system 1 is fastened to the structure 51 of the aircraft 5 by bolts used as releasable fastener means 9. As a result, the friction energy absorber system 1 can easily be replaced, should that be necessary.

In FIG. 1, a first embodiment of the friction energy absorber system 1 has a single friction energy absorber device 2 with a deformation axis Ad, a single support 3, and a single friction device 4. The support 3 is connected to the cover 7 via a slideway connection along a translation axis At parallel to the deformation axis Ad, and the friction device 4 generates a friction force during movement between the support 3 and the cover 7 along the translation axis At.

The support 3 is an element forming an integral portion of the base 6. The base 6 and the cover 7 are secured to each other using adhesive as securing means 8. The friction device 4 is arranged between the support 3 and the cover 7 at the periphery of the friction energy absorber system 1. By way of example, the friction device 4 is constituted by a flat gasket. The cover 7 has deformable zones 71 formed by folds or corrugations in a wall of the cover 7. These deformable zones 71 are adapted to deform when a force is applied to the cover 7 that is greater than a deformation force.

In FIG. 2, a second embodiment of the friction energy absorber system 1 has two friction energy absorber devices 2, 2' with two non-parallel deformation axes Ad, Ad', a single support 3, and a single friction device 4. The support 3 is connected to the cover 7 by a pivot type connection that is slidable along a translation axis At parallel to the deformation axis Ad, and the friction device 4 generates a friction force during movement between the support 3 and the cover 7 along the translation axis At.

The support 3 is secured to the base 6 using beads of welding as securing means 8. The base 6 and the cover 7 are secured to each other using a rivet as securing means 8. The rivet 8 is positioned in a front zone of the friction energy absorber system 1, with the cover 7 being held to the base 6 by means of the friction device 4 and the support 3 in a rear zone of the friction energy absorber system 1. In addition, the bolts used as releasable fastener means 9 for fastening the friction energy absorber system 1 to the structure 51 also enable the cover 7 to be secured to the structure 51. The cover 7 is deformable as a whole under a deformation force.

In FIG. 3, a third embodiment of the friction energy absorber system 1 has two friction energy absorber devices 2, 2' with two non-parallel deformation axes Ad, Ad', two supports 3, 3', and two friction devices 4, 4'. Each support 3, 3' is connected to the cover 7 via a pivot type connection that is slidable along a translation axis At, At' that is parallel to a respective one of the deformation axes Ad, Ad', and each friction device 4, 4' generates a respective friction force during movement during a support 3, 3' and the cover 7 along the respective translation axes At, At'.

The base 6 is formed by the structure 51 of the aircraft 5 on which the friction energy absorber system 1 is fastened. Each support 3, 3' is secured to the base 6, i.e. the structure 51, by using bolts as releasable fastener means 9. Each support 3, 3' needs to be fastened to the structure 51 before the cover 7 is fastened to the structure 51, after the two friction energy absorber devices 2 have previously been positioned in the cover 7. The cover 7 is held to the base 6, i.e. to the structure 51, by the friction devices 4, 4' and the supports 3, 3'. The cover 7 is deformable as a whole when a force greater than a deformation force is applied to the cover 7.

In the second and third embodiments of the friction energy absorber system 1, each friction device 4, 4' is circular in shape and is arranged between each support 3, 3' and a cylindrical wall 72 forming an integral portion of the cover 7. By way of example, each friction device 4, 4' under such circumstances is formed by an O-ring positioned in a groove 31 of a support 3, 3'.

In addition, for the second and third embodiments of the friction energy absorber system 1 shown in FIGS. 2 and 3, the cover 7 of each friction energy absorber system 1 is of a shape that is adapted, depending on its position on the structure 51 of the aircraft 5, so as to limit the aerodynamic drag of the friction energy absorber system 1 that is generated while the aircraft 5 is in flight.

Whatever the embodiment of the friction energy absorber system 1, the deformation force is preferably less than the deformation threshold.

Figure 4:
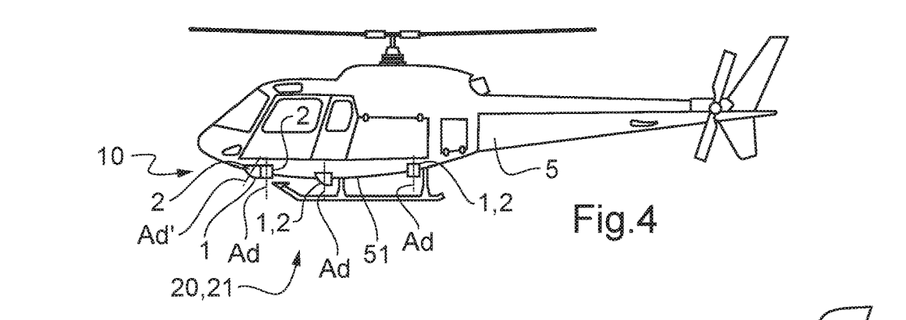
FIGS. 4 to 5 show an aircraft including a system for providing protection against hard landings.
Figure 5:
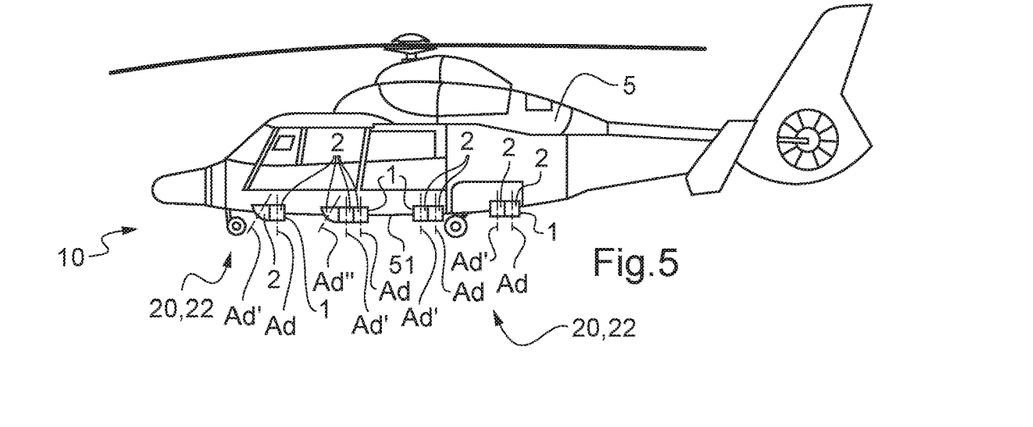

A plurality of friction energy absorber systems 1 may be installed on the structure 51 of an aircraft 5, as shown in FIGS. 4 and 5, in order to form a protection system 10 against hard landings.

The protection system 10 against hard landings is used during a hard landing or indeed a crash of the aircraft 5 during which the landing gear 20 of the aircraft 5 is destroyed. The landing gear 20 may be skid-landing gear 21 as shown in FIG. 4, or wheeled landing gear 22 as shown in FIG. 5.

Specifically, after the landing gear 20 has been destroyed during a hard landing or indeed a crash, the aircraft 5 comes into contact with the ground via the structure 51, and in particular via impact points of the structure 51. The potential impact points of the structure 51 during a hard landing or indeed a crash are generally known. Under such circumstances, a friction energy absorber system 1 is arranged at each of the potential impact points so as to absorb at least a portion of the energy generated by the hard landing or indeed the crash and thereby limit the stresses transmitted firstly to the structure 51 of the aircraft 5, and secondly to the occupants of the aircraft 5.

The number of friction energy absorber systems 1 included in a protection system 10 against hard landings depends in particular on the size and the weight of the aircraft 5. Each friction energy absorber system 1 may have one or more energy absorber devices 2, 2'.

For example, for the aircraft shown in FIG. 4, the protection system 10 against hard landings has three friction energy absorber systems 1. A first friction energy absorber system 1 is positioned in a front zone of the aircraft 5 and is provided with two energy absorber devices 2, 2' with two non-parallel deformation axes Ad, Ad', and two other friction energy absorber systems 1 are positioned in central and rear zones of the aircraft 5, each being provided with a single energy absorber device 2 having a deformation axis Ad that is substantially vertical.

For the aircraft shown in FIG. 5, which is of greater weight, the protection system 10 against hard landings has four friction energy absorber systems 1. A first friction energy absorber system 1 is positioned in a front zone of the aircraft 5 and is provided with two energy absorber devices 2, 2' having two non-parallel deformation axes Ad, Ad'. A second friction energy absorber system 1 is positioned in a central zone of the aircraft 5 and is provided with three energy absorber devices 2, 2' having three deformation axes Ad, Ad', Ad", including two non-parallel deformation axes Ad, Ad', Ad". Two other friction energy absorber systems 1 are positioned in a rear zone of the aircraft 5 and are provided with two energy absorber devices 2 having two deformation axes Ad, Ad' that are parallel and substantially vertical.

The use of a friction energy absorber system 1 having a plurality of energy absorber devices 2 with parallel deformation axes Ad, Ad' serves to increase the energy absorption capacity of the friction energy absorber system 1, mainly along a direction parallel to the deformation axes Ad, Ad'. The use of a friction energy absorber system 1 having a plurality of energy absorber devices 2 with non-parallel deformation axes Ad, Ad' serves firstly to increase the energy absorption capacity of the friction energy absorber system 1, and secondly to absorb energy along directions parallel respectively to these deformation axes Ad, Ad'.

The direction to which precedence should be given for absorbing energy is a vertical direction, i.e. substantially parallel to the direction of the Earth's gravity. Nevertheless, the aircraft 5 can impact against the ground in a direction that is longitudinal relative to the aircraft 5, corresponding to the main direction of advance of the aircraft 5, or indeed along a direction that is transverse relative to the aircraft 5.

The operation of the friction energy absorber system 1 is substantially identical for each of the embodiments and regardless of the direction of the impact of the aircraft 5 against the ground.

During a hard landing or a crash, and after the landing gear of the aircraft 5 has been destroyed, a large force is transmitted to the structure 51 of the aircraft 5 via each of the impact points of the structure 51 and parallel to the direction of impact against the ground.

When this force is greater than a sliding threshold of the friction energy absorber system 1 along a deformation axis Ad, Ad', energy is absorbed by at least one energy absorber device 2 of the friction energy absorber system 1, mainly as a result of plastic deformation of the energy absorber device 2. This force is applied in compression against the friction energy absorber system 1. This force also leads to plastic deformation of the cover 7, as a whole or in deformable zones 71 that it includes, and possibly also to movement of the cover 7 relative to one or more supports 3, 3' along respective translation axes At, At'.

Specifically, energy is also absorbed, to a lesser extent, during such plastic deformation of the cover 7. In addition, energy absorption can take place during movement of the cover 7 relative to one or more supports 3, 3' via a friction device 4, 4' associated with the translation axis At, At'.

Along a deformation axis Ad of an energy absorber device 2, the sliding threshold is equal to the sum of a deformation threshold for the energy absorber device 2, plus a friction force of a friction device 4 having a translation axis At parallel to the deformation axis Ad, plus the deformation force of the cover 7.

In addition, using a plurality of energy absorber devices 2, 2' in combination with the presence of a plurality of friction devices 4 between the cover 7 and each support 3 avoids each friction energy absorber system 1 returning elastically after plastic deformation of each energy absorber device 2, 2' and of the cover 7, thereby limiting the rebound effect of the aircraft 5 following a first impact with the ground. In addition, each friction device 4 also avoids the cover 7 of the friction energy absorber system 1 becoming separated during this first impact. Under such circumstances, each friction energy absorber system 1 advantageously remains operational for absorbing energy during a second impact of the aircraft 5 against the ground. Finally, using a plurality of friction energy absorber systems 1 enables sufficient energy absorption potential to be conserved for use in the second impact against the ground.

The protection system 10 against hard landings thus advantageously makes it possible to absorb a fraction of the energy generated by the successive impacts of the aircraft 5 against the ground so as to limit the energy transferred to the structure 51 of the aircraft 5, thereby preserving the mechanical integrity of the structure 51 and the physical integrity of the occupants of the aircraft 5.

Naturally, the present invention may be subjected to numerous variations as to its implementation. Although several embodiments are described, it will readily be understood that it is not conceivable to identify exhaustively all possible embodiments. It is naturally possible to envisage replacing any of the means described with equivalent means without going beyond the ambit of the present invention.

What is claimed is:

1. A protection system for protecting an aircraft against hard landings, the aircraft having a structure, wherein the protection system against hard landings comprises at least one friction energy absorber system, each friction energy absorber system for arranging at an impact point of the structure against the ground in the event of a hard landing or of a crash of the aircraft, each friction energy absorber system comprising:
   a base;
   a cover;
   at least one support secured to the base and configured to connect to the cover while allowing movement between the support and the cover at least in translation along a translation axis;
   at least one energy absorber device arranged between the base and the cover in contact with the support and the cover; and
   at least one friction device arranged between the cover and each support, each friction device generating a friction force during relative movement between the support and the cover along the translation axis so that the energy absorber device, after plastic deformation, remains in contact with the base and the cover along the translation axis.

2. The protection system according to claim 1, wherein the energy absorber device is precompacted prior to being arranged in the friction energy absorber system so as to eliminate a force peak associated with a first deformation of the energy absorber device.

3. The protection system according to claim 1, wherein each energy absorber device is capable of deforming in compression under the application of a force greater than a deformation threshold along a deformation axis, and the friction energy absorber system has at least two energy absorber devices suitable for deforming in compression along respective non-parallel deformation axes so as to enable energy to be absorbed along directions that are different.

4. The protection system according to claim 1, wherein the friction energy absorber system is designed to be fastened to the structure of the aircraft, with the base being formed by the structure.

5. The protection system according to claim 1, wherein each energy absorber device is capable of deforming in compression under the application of a force greater than a deformation threshold along a deformation axis, and a translation axis for movement between the support and the cover associated with a friction device generating a friction force is arranged parallel to a deformation axis of an energy absorber device.

6. The protection system according to claim 5, wherein the cover is capable of deforming under a deformation force, and the energy absorber device, for which the deformation threshold is defined along the deformation axis parallel to the translation axis associated with the friction device generating a friction force, deforms plastically as soon as a compression force greater than a sliding threshold equal to the sum of the deformation threshold, plus the friction force, plus the deformation force is applied along the translation axis to the friction energy absorber system.

7. The protection system according to claim 6, wherein the friction force of the friction device along the translation axis and the deformation force of the cover are less than the deformation threshold of the energy absorber device defined along the deformation axis, which is parallel to the translation axis.

8. The protection system against hard landings according to claim 1, wherein each energy absorber device is capable of deforming in compression on application of a force greater than a deformation threshold along a deformation axis, and the protection system against hard landings includes at least two friction energy absorber systems arranged so that the respective deformation axes of two energy absorber devices of two distinct friction energy absorber systems are not parallel.

9. The protection system against hard landings according to claim 1, wherein the cover of each friction energy absorber system is of a shape serving to limit the aerodynamic drag generated during a flight of the aircraft.

10. An aircraft including a structure, wherein the aircraft includes the protection system according to claim 1.

11. The aircraft according to claim 10, wherein the cover of each friction energy absorber system is of a shape that serves to limit the aerodynamic drag that is generated during a flight of the aircraft.

12. The aircraft according to claim 10, wherein the base of at least one friction energy absorber system is formed by the structure.

13. The aircraft according to claim 10, wherein each friction energy absorber system is fastened to the structure by means of at least one releasable fastener means.

14. The protection system according to claim 1, wherein the energy absorber is capable of deforming in compression on application of a force greater than a deformation threshold along a deformation axis, and the protection system includes at least two friction energy absorber systems arranged so that the respective deformation axes of two energy absorber devices of two distinct friction energy absorber systems are not parallel.

15. The protection according to claim 1, wherein the cover is of a shape serving to limit the aerodynamic drag generated during a flight of the aircraft.

16. A protection system for protecting an aircraft, the aircraft having a structure, wherein the protection system comprises a friction energy absorber system, the friction energy absorber system comprising:
   a base;
   a cover;
   a support secured to the base and connected to the cover, the support allowing relative movement between the support and the cover in translation along a translation axis;
   an energy absorber arranged between the base and the cover in contact with the support and the cover; and
   a friction device arranged between the cover and each support, the friction device capable of generating a friction force during relative movement between the support and the cover along the translation axis to enable the energy absorber device to plastically deform and remain in contact with the base and the cover along the translation axis.

17. The protection system according to claim 16, wherein the energy absorber is precompacted prior to being arranged in the friction energy absorber system so as to eliminate a force peak associated with a first deformation of the energy absorber device.

18. The protection system according to claim 16, wherein the energy absorber is capable of deforming in compression under the application of a force greater than a deformation threshold along a deformation axis, and the friction energy absorber system has two energy absorbers capable of deforming in compression along respective non-parallel deformation axes so as to enable energy to be absorbed along directions that are different, and wherein the friction energy absorber system is capable of fastening to the structure of the aircraft, with the base being formed by the structure.

19. The protection system according to claim 16, wherein the energy absorber is capable of deforming in compression under the application of a force greater than a deformation threshold along a deformation axis, and a translation axis for movement between the support and the cover associated with the friction device is arranged parallel to a deformation axis of an energy absorber device, and wherein the cover is capable of deforming under a deformation force, and the energy absorber, for which the deformation threshold is defined along the deformation axis parallel to the translation axis associated with the friction device, deforms plastically when a compression force greater than a sliding threshold equal to the sum of the deformation threshold, plus the friction force, plus the deformation force is applied along the translation axis to the friction energy absorber system, wherein the friction force of the friction device along the translation axis and the deformation force of the cover are less than the deformation threshold of the energy absorber defined along the deformation axis, which is parallel to the translation axis.

20. An aircraft including a structure, wherein the aircraft includes the protection system according to claim 16.

* * * * *